United States Patent [19]

Clark et al.

[11] 4,311,366
[45] Jan. 19, 1982

[54] IMAGE FOCUSING SYSTEM

[75] Inventors: Alan D. Clark, Little Chalfont; Richard P. Harvey, Amersham; Colin A. Leming, Edgeware, all of England

[73] Assignee: J. H. Dallmeyer Limited, London, England

[21] Appl. No.: 16,105

[22] Filed: Feb. 28, 1979

[30] Foreign Application Priority Data

Mar. 1, 1978 [GB] United Kingdom ............ 8165/78

[51] Int. Cl.³ .................... G02B 9/62; G02B 17/04
[52] U.S. Cl. .................................................. 350/445
[58] Field of Search ................ 350/202, 203, 445, 446

[56] References Cited

U.S. PATENT DOCUMENTS

| | | | |
|---|---|---|---|
| 2,860,543 | 11/1958 | Miles | 88/26 |
| 3,357,775 | 12/1967 | Appeldorn et al. | 350/186 |
| 3,498,713 | 3/1970 | Schlegel et al. | 350/202 X |
| 3,701,587 | 10/1972 | Kojima | 350/446 |
| 3,709,582 | 1/1973 | Walker | 350/202 |
| 3,716,291 | 2/1973 | Giesecke | 350/203 |
| 3,731,990 | 5/1973 | Van Orden | 350/446 |

FOREIGN PATENT DOCUMENTS

| | | |
|---|---|---|
| 343850 | 11/1921 | Fed. Rep. of Germany . |
| 382193 | 9/1923 | Fed. Rep. of Germany . |
| 1114042 | 9/1961 | Fed. Rep. of Germany . |
| 1145822 | 3/1963 | Fed. Rep. of Germany . |
| 1299901 | 7/1969 | Fed. Rep. of Germany . |
| 1937797 | 2/1971 | Fed. Rep. of Germany . |

Primary Examiner—John K. Corbin
Assistant Examiner—Scott J. Sugarman
Attorney, Agent, or Firm—Kenyon & Kenyon

[57] ABSTRACT

The invention concerns an image focusing system for use in a reprographic camera. To improve the compactness of such a camera, it is known to provide a reflecting element to fold the optical axis extending from an object plane O to the image plane. The known disposition of the reflecting element between a focusing lens system and the image plane necessitates a very large reflecting surface area to satisfy the usual operational requirements of the aperture and field angle. This precludes the use of prisms as the reflecting element, and therefore introduces instability where image reversal is required since a roof mirror, in which the roof angle may drift, must be used.

It is proposed to arrange the reflecting element within the focusing lens system, i.e. between two lens assemblies to permit smaller elements, and more particularly interchangeable plane and roof reflector prisms, to be used.

7 Claims, 4 Drawing Figures

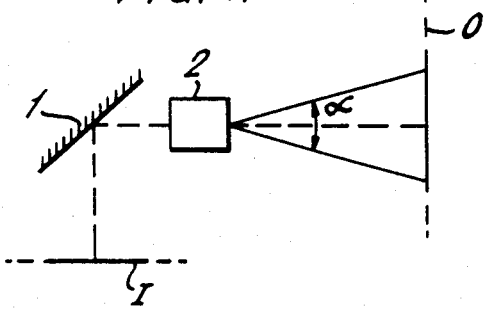
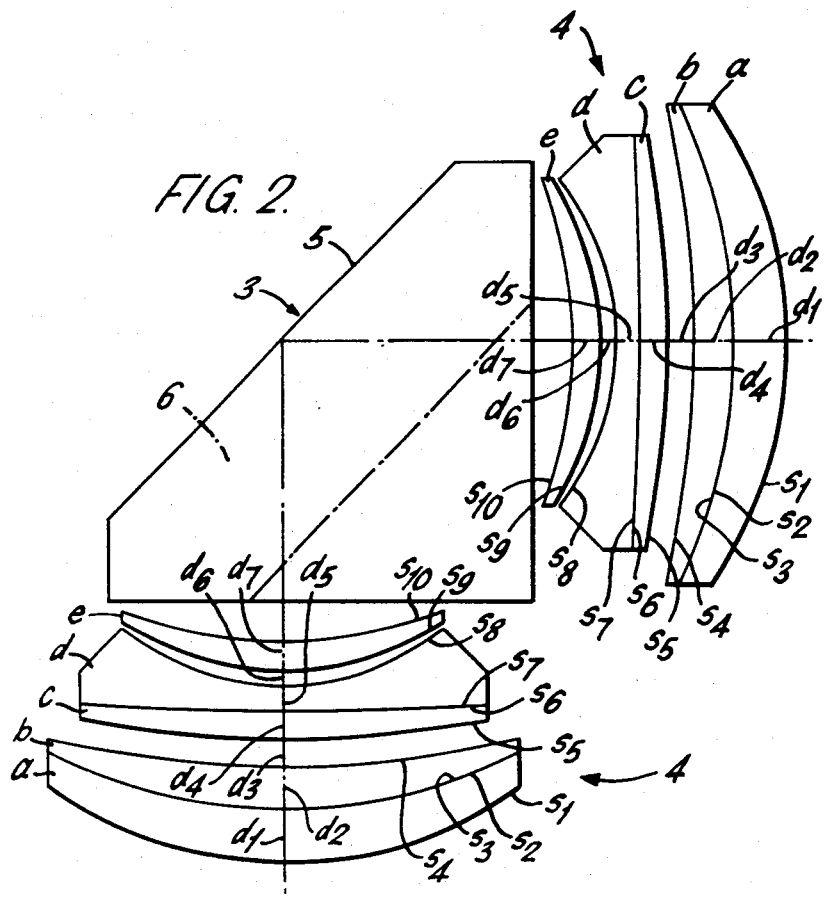

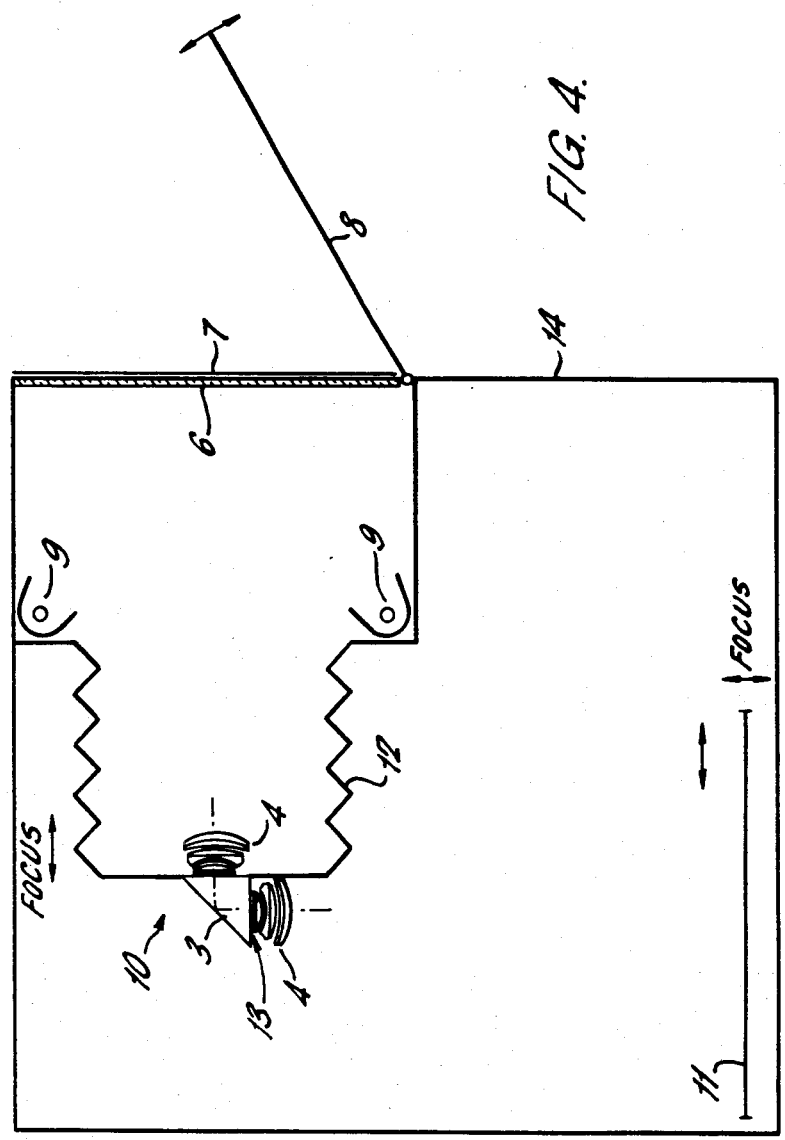

IMAGE FOCUSING SYSTEM

This invention relates to optical systems designed for image focusing and including a reflective element for folding the system, and more particularly to a folded optical system for use in a reprographic camera, that is to say a photographic copying system in which an image of an original which may be a document carrying printed matter thereon, placed in an object plane is to be focused in an image plane at which a photosensitive element, such as a photographic plate, will be located.

By folding the optical system, the dimensions of the copying system may be reduced.

Hitherto, folded optical copying systems used in reprographic cameras have commonly consisted of a compound lens system in combination with an external prism or mirror to rotate the optical axis through the required folding angle, such as ninety degrees as illustrated schematically in FIG. 1 of the accompanying drawings. The prism or mirror 1 may have either a plane reflecting surface or a roof surface to cause image reversal, the latter requiring considerably more space for use with a given lens system 2. It is usually necessary for such systems to be capable of operating at relative apertures of f/11 or larger and moderate field angles $\alpha$, typically in excess of forty degrees. The known optical arrangement has the disadvantage that, when it is applied to a design which satisfies these requirements, the reflecting surface is considerably larger than the lens system.

Accordingly, in most commonly used systems image reversal is accomplished using a roof mirror arrangement as the reflecting surface dimensions are too great to permit the use of a prism. However, a failing of such an arrangement is that a large mechanical setting system must be provided to allow the required precision of roof angle to be achieved.

It is an object of the invention at least partially to alleviate the aforesaid disadvantages.

According to the present invention there is provided an image focusing system for use in a reprographic camera, the system having a reflective element to fold the optical axis of the system and a compound lens system comprising two lens assemblies, wherein the reflective element is arranged between said lens assemblies.

The location of the reflective element within the lens system, as opposed to the external disposition used hitherto, permits the use of a much smaller element than before.

When designed to achieve the required characteristics mentioned before in a reprographic camera, the lens assemblies will satisfy certain basic criteria in order that the space between them is of sufficient dimension to accommodate a reflecting element. These criteria may be expressed in the following manner. The optical surfaces constituting each lens assembly are arranged in two groups, of which one is closest to, and the other is furthest from the reflecting element; the power, kn, of said one group is negative and the power, kp, of said other group is positive and the ratio kp:kn lies within the range $-1:1$ and $-3:1$.

Preferably the reflecting element is a prism, and is interchangeable to permit selection between prisms having plane and roof reflecting surfaces so as to provide selectively the aforesaid image reversal.

In certain preferred embodiments to be described later herein, the air/glass surfaces of all elements in each lens system are all concave to the reflector, and the said one group of optical surfaces are provided by an inner meniscus lens closest to the reflecting element, and an outer cemented lens doublet.

Preferred embodiments of the invention will now be described by way of example with reference to FIGS. 2 to 4 of the accompanying drawings in which:

FIG. 2 illustrates a first focusing system according to the invention;

FIG. 4 illustrates schematically the essential elements of a reprographic camera incorporating a focusing system according to the invention.

Figure 3:
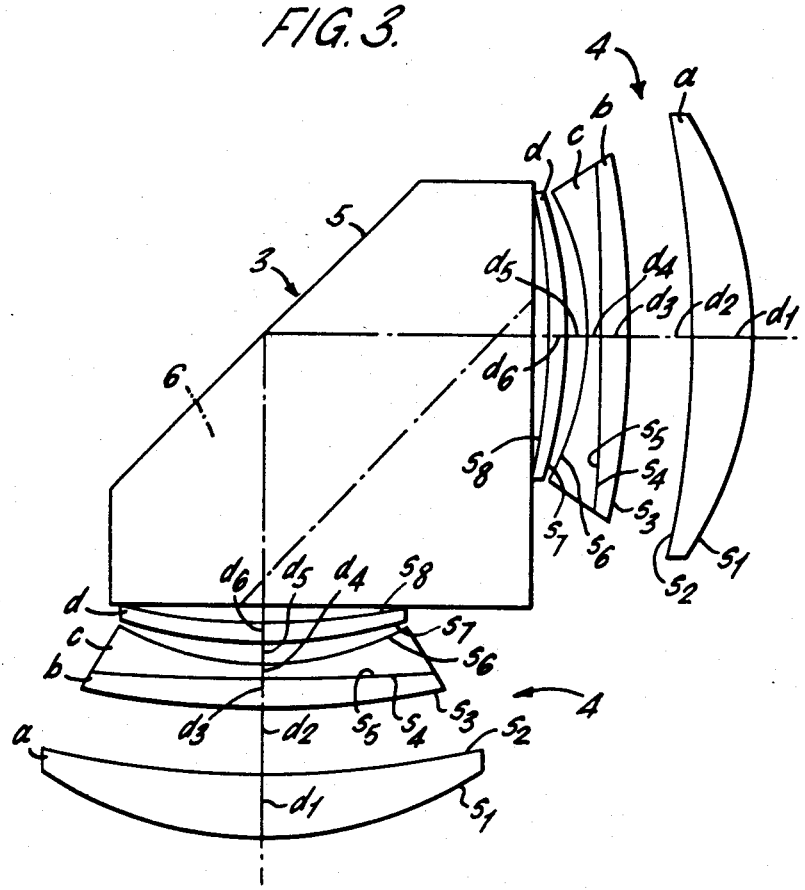
FIG. 3 illustrates a second focusing system according to the invention.

In the focusing system illustrated in FIG. 2, a lens system comprises lens elements a to e placed on each side of a reflective element 3, which is either a reflecting mirror or prism, as shown, so that the latter is significantly smaller than before. The two lens assemblies 4 each comprising the set of lens elements on one side of element 3 are not necessarily individually fully corrected for optical aberrations, but, as a whole, the lens system has a sufficiently large air space to accommodate the required reflecting component whilst achieving sufficient correction of optical aberration at the relative apertures and field angles characteristic of the system in which the focusing system is to operate.

Furthermore, a prism may be used as the reflective element for even the largest commonly used systems where image reversal is required so that the desired tolerance on roof angle may be set during construction and cannot drift from that value. The prism illustrated by full lines has a plane reflecting surface 5, but the chain-dot line illustrates the alternative use of a roof prism having two mutually perpendicular reflecting surfaces 6.

The optical surfaces constituting each of the two lens assemblies 4 may be considered as being arranged in two groups, the composition of each group not necessarily being dictated by the axial separations of the surfaces of that assembly, such that if the power of the group closest to the reflecting element is kn and the power of the group furthest from the reflecting element is kp, then these two powers are restricted to the range of ratios between the two limits.

$$kp = -kn$$

and $$kp = -3kn$$

where kp is positive and kn is negative.

In a particular arrangement as illustrated in FIG. 2 and designed to have an equivalent focal length of 20 units of dimension at a relative aperture of f/11 and having a field angle of 42°, the dimensions, relative spacing and optical characteristics of the lens elements a to e are as set out in the following table, in which $S_1$ to $S_{10}$ identify the lens surfaces shown in FIG. 2, and $d_1$ to $d_7$ identify the axial thickness or separation between successive pairs of axially spaced surfaces.

TABLE I

| Element | Surface | Radii of curvature | Axial thickness or separation | mean RI | Abbe V. value |
|---|---|---|---|---|---|
| a | $S_1$ | 4.56 | | | |
| | $S_2, S_3$ | 6.10 | $d_1 = .577$ | 1.5176 | 64.2 |
| b | $S_4$ | 10.94 | $d_2 = .413$ | 1.6922 | 54.7 |
| | | | $d_3 = .306$ | Air | |
| c | $S_5$ | 9.74 | | | |
| | $S_6, S_7$ | 22.31 | $d_4 = .322$ | 1.6922 | 54.7 |
| d | $S_8$ | 2.88 | $d_5 = .250$ | 1.5488 | 45.6 |
| | | | $d_6 = .157$ | Air | |
| e | $S_9$ | 3.30 | $d_7 = .324$ | 1.5900 | 61.3 |
| | $S_{10}$ | 4.91 | | | |

For this assembly $kp = 0.0826$ $kn = -0.0620$ where kp is the positive power of the surfaces of elements a and b and kn is the negative power of the surfaces of elements c, d and e. The elements a and b constitute a cemented doublet, as do elements c and d, the element closest to the reflecting element 3 being a single meniscus e. All air/glass surfaces are concave to the reflecting element.

FIG. 3 illustrates another system, again having a reflecting element 3 between two lens assemblies 4, each consisting of a set of elements a to d, so as to permit the use of a smaller reflecting element than before. Again the system as a whole is corrected for optical aberration and a roof prism may be used as the reflecting element. However, in this system, either of the two lens assemblies 4 is interchangeable with other assemblies designed to provide a range of system magnifications without the need to change both conjugates and a similar level of optical aberration correction can be achieved at each magnification setting to that achieved with the basic system.

The ability to interchange lens assemblies can also be used to achieve a change in the optical system power where a different equivalent focal length is required without exchanging the whole lens system.

In a particular arrangement as illustrated in FIG. 3 and designed to have an equivalent focal length of 20 units of dimension at a relative aperture of f/11 and having a field angle of 42°, the dimensions, relative spacing and optical characteristics of the lens elements a to d are as set out in the following table:

TABLE II

| Element | Surface | Radii of curvature | axial thickness or separation | mean RI | Abbe V. value |
|---|---|---|---|---|---|
| a | $S_1$ | 4.18 | | | |
| | $S_2$ | 10.82 | $d_1 = .614$ | 1.6610 | 57.0 |
| | | | $d_2 = .683$ | Air | |
| b | $S_3$ | 9.56 | | | |
| | $S_4, S_5$ | 35.39 | $d_3 = .297$ | 1.5910 | 61.0 |
| c | $S_6$ | 3.06 | $d_4 = .140$ | 1.5505 | 45.3 |
| | | | $d_5 = .218$ | Air | |
| d | $S_7$ | 4.96 | | | |
| | | | $d_6 = .202$ | 1.5116 | 64.2 |
| | $S_8$ | 7.09 | | | |

For this assembly $kp = 0.1006$ $kn = 0.0850$

Where kp is the positive power of the surfaces of element a and kn is the negative power of the surfaces of elements b, c and d. Again the group of elements having power kn consists of a cemented doublet b, c and a single meniscus d, all air/glass surfaces being concave to the reflecting element.

With reference now to FIG. 4, a reprographic camera is illustrated schematically and includes means defining an object plane, such as a glass plate 6 against which an original 7 to be copied is held by means of a hinged backing plate 8. An array of lamps 9 is disposed to illuminate the original, and a focusing system 10 as described above is disposed to focus an image of the original in an image plane at which a photosensitive element 11, which may be photographic film or a metallic plate bearing a photoresist layer for subsequent etching, is to be located by a suitable means. Appropriate means control the exposure, and the magnification is adjustable by relative movement of the focal planes and the system 10. for instance between unity and one half. A bellows arrangement 12 permits the required movement, as shown, of the system 10 whilst ensuring that no light, other than that passing through the lens assemblies 4 and reflecting element 3 reaches the element 11. The optical arrangement is housed within a light-tight cabinet 14.

Filters 13 may be arranged in the focusing system as required, the most appropriate position being, as illustrated, adjacent the entrance and exit faces of the prism 3.

We claim:

1. An image focusing system comprising two lens assemblies defining an optical axis; and a reflecting element for folding said optical axis of the system and disposed between said lens assemblies; wherein each lens assembly comprises a plurality of lens elements having optical surfaces of which at least some are air-to-glass surfaces, said optical surfaces being arranged in a first group having a negative power and being disposed closer to the reflecting element and in a second group having a positive power and disposed further from the reflecting element, the ratio of the powers of the second group to the first group being within the range from $-1:1$ and $-3:1$, and wherein all said air-to-glass surfaces are concave towards said reflecting element.

2. An image focusing system according to claim 1 wherein in each assembly the lens element which is closest to the reflecting element is a meniscus.

3. An image focusing system according to claim 1 wherein said first group of optical surfaces is provided by a meniscus and a cemented doublet, the meniscus being closer to the reflecting element than said doublet.

4. An image focusing system comprising two lens assemblies defining an optical axis and a reflecting element for folding said optical axis and being disposed along said optical axis between the two lens assemblies, each lens assembly comprising the elements a, b, c, d and e substantially in accordance with the following:

| Element | Surface | Radii of curvature | Axial thickness or separation | mean RI | Abbe V. value |
|---|---|---|---|---|---|
| a | $S_1$ | 4.56 | $d_1 = .577$ | 1.5176 | 64.2 |
|   | $S_2, S_3$ | 6.10 | | | |
| b | | | $d_2 = .413$ | 1.6922 | 54.7 |
|   | $S_4$ | 10.94 | | | |
|   | | | $d_3 = .306$ | Air | |
| c | $S_5$ | 9.74 | $d_4 = .322$ | 1.6922 | 54.7 |
|   | $S_6, S_7$ | 22.31 | | | |
| d | | | $d_5 = .250$ | 1.5488 | 45.6 |
|   | $S_8$ | 2.88 | | | |
|   | | | $d_6 = .157$ | Air | |
| e | $S_9$ | 3.30 | $d_7 = .324$ | 1.5900 | 61.3 |
|   | $S_{10}$ | 4.91 | | | |

$kp = 0.0826$ $kn = -0.0620$

5. An image focusing system comprising two lens assemblies defining an optical axis and a reflecting element for folding said optical axis and being disposed along the optical axis between the two lens assemblies, each lens assembly comprising the elements a, b, c and d substantially in accordance with the following:

| Element | Surface | Radii of curvature | axial thickness or separation | mean RI | Abbe V. value |
|---|---|---|---|---|---|
| a | $S_1$ | 4.18 | $d_1 = .614$ | 1.6610 | 57.0 |
|   | $S_2$ | 10.82 | | | |
| b | $S_3$ | 9.56 | $d_2 = .683$ | Air | |
|   | $S_4, S_5$ | 35.39 | $d_3 = .297$ | 1.5910 | 61.0 |
| c | $S_6$ | 3.06 | $d_4 = .140$ | 1.5505 | 45.3 |
|   | | | $d_5 = .218$ | Air | |
| d | $S_7$ | 4.96 | $d_6 = .202$ | 1.5116 | 64.2 |
|   | $S_8$ | 7.09 | | | |

$kp = 0.1006$ $kn = 0.0850$

6. In an image focusing system for a reprographic camera, the image focusing system being capable of operating at a relative aperture of f/11 and at a field angle of at least 40°, the improvement wherein said image focusing system comprises two lens assemblies for defining an optical axis and a reflecting element for folding said optical axis, said reflecting element being arranged between said lens assemblies along said optical axis, each lens assembly comprising a plurality of lens elements of which the optical surfaces consist of a first and a second group, the power of the first group being negative and the power of the second group being positive and the ratio between the powers of said second and first groups being in the range −1:1 and −3:1.

7. An image focusing system according to claim 6 in which said lens elements provide a plurality of air-to-glass surfaces, all of which are concave to the said reflecting element.

* * * * *